United States Patent [19]

Sato

[11] Patent Number: 5,088,074
[45] Date of Patent: Feb. 11, 1992

[54] MAGNETOOPTICAL RECORDING APPARATUS WITH PARTS ARRANGED TO MINIMIZE HEIGHT

[75] Inventor: Masatoshi Sato, Machida, Japan

[73] Assignee: Nikon Corporation, Tokyo, Japan

[21] Appl. No.: 666,481

[22] Filed: Mar. 6, 1991

Related U.S. Application Data

[63] Continuation of Ser. No. 376,042, Jul. 6, 1989, abandoned.

[30] Foreign Application Priority Data

Jul. 15, 1988 [JP] Japan ................................. 63-176289

[51] Int. Cl.$^5$ ..................... G11B 13/04; G11B 11/10; G11B 11/12
[52] U.S. Cl. ..................................... 369/13; 360/114; 360/59; 365/122
[58] Field of Search ................... 369/13; 360/59, 114, 360/66; 365/122

[56] References Cited

U.S. PATENT DOCUMENTS

| | | | |
|---|---|---|---|
| 4,855,975 | 8/1989 | Akasaka et al. | 360/59 |
| 4,878,132 | 10/1989 | Aratani et al. | 369/13 |
| 4,879,703 | 11/1989 | Kaku | 369/13 |
| 4,908,809 | 3/1990 | Tadokoro et al. | 369/13 |
| 4,914,643 | 4/1990 | Maeda | 360/59 |
| 4,962,492 | 10/1990 | Mathildus et al. | 360/114 |

FOREIGN PATENT DOCUMENTS

| | | |
|---|---|---|
| 0257530 | 3/1988 | European Pat. Off. . |
| 0258978 | 3/1988 | European Pat. Off. . |
| 3619618A1 | 6/1986 | Fed. Rep. of Germany . |
| 61-11977 | 1/1986 | Japan ..................................... 369/13 |

Primary Examiner—Stuart S. Levy
Assistant Examiner—Hoa T. Nguyen
Attorney, Agent, or Firm—Shapiro and Shapiro

[57] ABSTRACT

A recording apparatus for recording data on a magnetooptical disk includes a rotating device for rotating the magnetooptical disk, a laser device for irradiating the magnetooptical disk, a controller for controlling the intensity of the laser beam, an initial field applying device for initializing the magnetooptical disk, and a bias field applying device for applying a bias field to an area of the magnetooptical disk. The laser device, the controller, and the field applying devices are positioned at the same side of the magnetooptical disk as the rotating device to reduce the height of the apparatus.

6 Claims, 9 Drawing Sheets

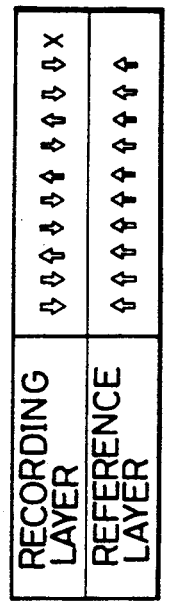
FIG.2
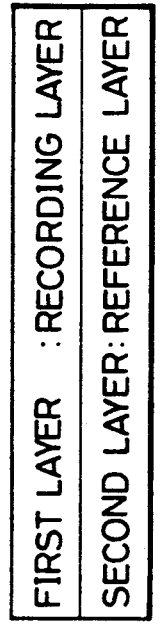
FIG.4
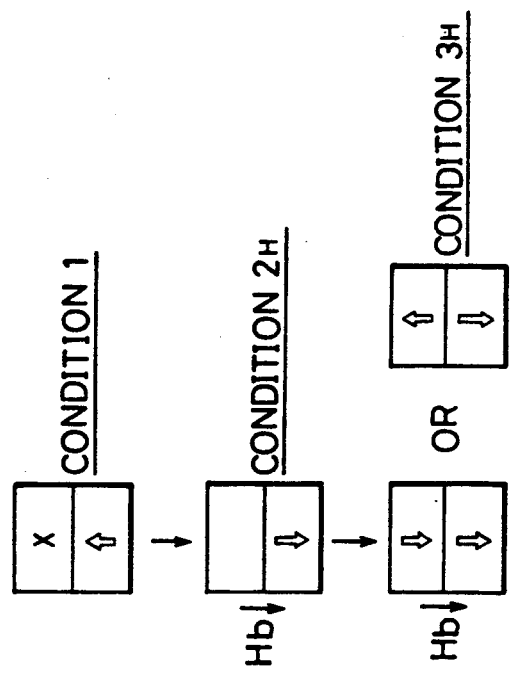
FIG.5
FIG.6

TYPE 1

TYPE 2

MAGNETOOPTICAL RECORDING APPARATUS WITH PARTS ARRANGED TO MINIMIZE HEIGHT

This is a continuation of application Ser. No. 376,042 filed July 6, 1989, now abandoned.

BACKGROUND OF THE INVENTION

1. Field of the Invention

The present invention relates to an overwritable (OW) magnetooptical recording apparatus through light intensity modulation only, without change in the direction of bias field Hb.

2. Related Background Art

In recent years, many efforts have been made to develop an optical recording/reproduction method, an optical recording apparatus and a medium usable therefor, which can satisfy various requirements including high density, large capacity, high speed access, and high recording/reproduction speed.

Of various optical recording/reproduction methods, the magnetooptical recording/reproduction method is most attractive due to its unique advantage that information can be erased after use and new information can be written thereon.

For re-using an already recorded medium, it is necessary (i) to initialize the medium again with an initializing apparatus, (ii) to equip the recording apparatus with an erasing head similar to the recording head, or (iii) to erase the recorded information, as a preliminary process, with a recording apparatus or an erasing apparatus.

In the magnetooptical recording method, it was considered impossible, from a practical point of view, to effect the overwriting, or recording of new information regardless of presence or absence of recorded information.

Nevertheless such overwriting is theoretically possible if the direction of the recording magnetic field (bias field) Hb can be freely modulated upward and downward. In practice, however, high-speed modulation of the direction of the bias field Hb is not possible. For example, if the bias field Hb is produced by a permanent magnet, it is necessary to mechanically invert the direction of the magnet, and such inversion of the magnet cannot be achieved at a high speed. Also if the bias field Hb is obtained by an electromagnet, it is still not possible to alter the direction of a large current at high speed.

However there has been remarkable progress in the technology, and the present applicant has disclosed, in a prior U.S. patent application Ser. No. 870,350 dated June 4, 1986, abandoned in favor of continuation application Ser. No. 090,973, filed Aug. 31, 1987; which was abandoned in favor of continuation application Ser. No. 453,255, filed Dec. 20, 1989 and in the West German Laidopen Patent DE 3619618 A1, a magnetooptical recording method capable of overwriting by modulating only the irradiating light intensity according to binary information to be recorded without turning on and off of the bias field Hb or modulation of direction thereof, and an overwritable magnetooptical recording medium and an overwritable magnetooptical recording apparatus usable in the method.

A characteristic feature of the invention of the prior application lies in the use of a magnetooptical recording medium composed of a multi-layered vertical anistropy magnetizable film including at least two layers, namely a recording layer (first layer) and an auxiliary recording layer (second layer).

Note that, in the present specification, one of the "upward" and "downward" directions of magnetization with respect to a film surface is defined as an "A direction" and the other is defined as a "non A direction".

The information is recorded by bits with "A-directed" magnetization and bits with "non-A-directed" magnetization, in the first layer (also in the second layer in some cases).

The method and the apparatus of the prior application function with the following steps:

(a) moving the medium;

(b) applying an initial field $H_{ini}$ so that, before recording, the direction of magnetization of the first layer is left unchanged, and that of the second layer is aligned in the "A direction";

(c) irradiating the medium with a laser beam;

(d) pulse modulating the intensity of said laser beam in response to the binary data to be recorded;

(e) when the laser beam is irradiated, applying a bias field to the irradiated portion; and (f) when the intensity of the pulse-modulated laser beam is at high level, forming either of the bit with "A-directed" magnetization and the bit with "non-A-directed" magnetization, and forming the other when said intensity is at low level.

Another characteristic feature of the invention of the prior application lies in the high and low levels of the beam intensity. More specifically, when the beam intensity is at the high level, the "A-directed" magnetization of the second layer is reversed to the "non-A-directed" by means of a bias field (Hb), and a bit with the "non-A-directed" (or "A-directed") magnetization is thus formed in the first layer by means of the "non-A-directed" magnetization of the second layer. When the beam intensity is at the low level, a bit with the "A-directed" (or "non-A-directed") magnetization is formed in the first layer by means of the "A-directed" magnetization of the second layer. If the required high and low levels are known, it is easy for a person skilled in the art to modulate the beam intensity, according to the prior application, only by partially modifying the modulating means.

In the present specification, if expressions AAA (or BBB) appear, AAA outside the parentheses in the first expression corresponds to AAA in the subsequent expressions AAA (or BBB).

As is well known, even when the recording is not conducted, the laser beam is often turned on at a very low level in order to, for example make access to a predetermined recording position on the medium. When the laser beam is also used for reading, it is often turned on at an intensity of very low level. In the prior application, the intensity of the laser beam may be set at the very low level. However the low level for forming a bit is higher than the very low level. Thus the laser beam of the prior application assumes the output waveform as shown in FIG. 1.

Though not disclosed in the prior application, there may be employed, instead of a single beam, two mutually close beams for recording, of which the leading one is in generally a low-level unmodulated beam (for erasing) while the trailing one is a high-level beam (for recording) modulated according to the information.

The invention of the prior application is divided into first and second aspects. In both aspects, the recording medium has a multilayered structure as shown in FIG. 2.

The first layer is a recording layer, which exhibits a high coercivity at room temperature and has a low reversing temperature. The second layer is a reference layer, which exhibits a low coercivity at room temperature and has a higher reversing temperature than the first layer. Both layers comprise perpendicular magnetic anisotropy layers. Note that each of the first and second layers can comprise a multi-layered structure. If necessary, a third layer can be interposed between the first and second layers. In addition, a clear boundary between the first and second layers need not be formed, and one layer can be gradually converted into the other.

In the following there will be employed the following symbols;
$H_{C1}$: coercivity of the recording layer;
$H_{C2}$: coercivity of the reference layer;
$T_{C1}$: Curie temperature of the recording layer;
$T_{C2}$: Curie temperature of the reference layer;
$T_R$: room temperature;
$T_L$: temperature of the recording medium under low-level laser beam irradiation;
$T_H$: temperature of the recording medium under high-level laser beam irradiation;
$H_{D1}$: coupling field applied to the recording layer; and
$H_{D2}$: coupling field applied to the reference layer.

In the first aspect, the recording medium satisfies the following Formula 1, and satisfies Formulas 2 to 5 at room temperature:

$$T_R < T_{C1} \approx T_L < T_{C2} \approx T_H \quad \text{Formula 1}$$

$$H_{C1} > H_{C2} + |H_{D1} \mp H_{D2}| \quad \text{Formula 2}$$

$$H_{C1} > H_{D1} \quad \text{Formula 3}$$

$$H_{C2} > H_{D2} \quad \text{Formula 4}$$

$$H_{C2} + H_{D2} < |H_{ini}| < H_{C1} \pm H_{D1} \quad \text{Formula 5}$$

In these formulas, symbol "$\approx$" means "equal to" or "substantially equal to". In addition, in double signs "$\pm$" and "$\mp$", the upper one corresponds to an A (antiparallel) type medium, while the lower one corresponds to a P (parallel) type medium (these media will be described later). Note that the P-type medium includes a ferromagnetic material.

The relationship between the coercivity and the temperature is as shown in FIG. 3, in which a thin curve represents the characteristics of the recording layer, while a bold curve represents those of the reference layer.

Therefore, when an initial field ($H_{ini}$) is applied to the recording medium at room temperature, the direction of magnetization of the reference layer is reversed without reversing that of the recording layer, according to Formula 5. When the initial field ($H_{ini}$) is applied to the recording layer before recording, the reference layer can be magnetized in the "A-direction" (in the drawings, the "A-direction" is indicated by an upward arrow ↑, and the "non-A direction" by a downward arrow ↓). If the initial field ($H_{ini}$) is decreased to zero, the direction of magnetization ↑ of the reference layer can be left unchanged without being re-reversed, according to Formula 4.

FIG. 4 schematically shows a state wherein only the reference layer is magnetized in the "A-direction ↑" immediately before recording.

Referring to FIG. 4, the direction x of magnetization in the recording layer represents previously recorded data. The state in FIG. 4 can be simplified as Condition 1 in FIG. 5.

In Condition 1 in FIG. 5, the high-level laser beam irradiates the recording medium to increase the medium temperature to $T_H$. Since $T_H$ is higher than the Curie temperature $T_{C1}$, the magnetization of the recording layer disappears. In addition, since $T_H$ is close to the Curie temperature $T_{C2}$, the magnetization of the reference layer also disappears completely or almost completely. A bias field (Hb) in the "A direction" or "non-A direction" is applied to the medium in accordance with the type thereof. The bias field (Hb) can be a stray field from the medium itself. For the sake of simplicity, assume that a bias field (Hb) of the "non-A direction" is applied to the medium. Since the medium is moving, a given irradiated portion is immediately separated from the laser beam and is cooled by air. When the temperature of the medium is reduced in the presence of the field Hb, the direction of magnetization of the reference layer is reversed to the "non-A direction" based on the field Hb (Condition $2_H$ in FIG. 5).

When the medium is further cooled and the medium temperature becomes lower than $T_{C1}$, the magnetization of the recording layer appears again. In this case the direction of magnetization of the recording layer is influenced by that of the reference layer due to a magnetic coupling (exchange coupling) force As a result, a magnetization ↓ (P-type medium) or ↑ (A-type medium) is formed according to the type of the medium, as shown in Condition $3_H$ in FIG. 5.

A change in conditions due to the high-level laser beam irradiation is herein called a high-temperature cycle.

Next, in the Condition 1 in FIG. 6, the lowlevel laser beam irradiates the medium to raise the medium temperature to $T_L$. Since $T_L$ is close to the Curie temperature $T_{C1}$, the magnetization of the recording layer disappears completely or almost completely. However, since $T_L$ is below the Curie temperature $T_{C2}$, the magnetization of the reference layer does not disappear (Condition $2_L$ in FIG. 6). In this state, though the bias field (Hb) is unnecessary, it is inevitably retained since it cannot be turned on and off rapidly.

However, since the coercivity $H_{C2}$ is maintained high, the direction of magnetization of the reference layer will not be reversed due to the field Hb. Since the medium is moving, a given irradiated portion is immediately separated from the laser beam and is cooled by air. As cooling progresses, magnetization of the recording layer appears again. The direction of magnetization is influenced by that of the reference layer due to the magnetic coupling force. As a result, a magnetization ↑ (P-type medium) or ↓ (A-type medium) appears according to the type of the medium. This magnetization is not changed even at room temperature (Condition $3_L$ in FIG. 6).

A change in the conditions due to the low-level laser beam irradiation is herein called a low-temperature cycle.

FIGS. 7 and 8 summarize the foregoing descriptions. Referring to FIGS. 7 and 8, bits of magnetization ↑ or ↓, which are opposite to each other, are formed in the high- and low-temperature cycles regardless of the direction of magnetization in the recording layer. More specifically, an over-writing operation is enabled by pulse modulating the laser beam between a high level (high-temperature cycle) and a low level (low-temperature cycle) in accordance with data to be recorded.

Although omitted in the foregoing description for the purpose of simplicity, a compensation temperature $T_{comp}$ exists between the Curie temperature and room temperature in certain vertically magnetizable films (magnetic compositions), and, in such compositions, the direction of magnetization of the reference layer in the bit formed in a high-temperature cycle is opposite to the bias field Hb at room temperature, since the direction of magnetization is inverted at the compensation temperature $T_{comp}$.

Note that the recording medium normally has a disk shape, and is rotated during recording. For this reason, a recorded portion (bit) is again influenced by the initial field $(H_{ini})$ during a single rotation. As a result, the direction of magnetization of the reference layer is alined with the original "A direction ↑". However, at room temperature, the magnetization of the reference layer can no longer influence that of the recording layer, so that the recorded data can be retained.

If the recording layer is irradiated with linearly polarized light, data can be reproduced as in the conventional magnetooptical recording medium, since the light reflected thereby includes data.

Also, in certain compositions of the recording and reference layers, there may be employed a method of applying a reproduction field $H_R$ after the recording or prior to the reproduction, thereby transferring the information of the recording layer to the reference layer aligned in the original "A-direction ↑" (this field application without the application of the initial field $H_{ini}$ after the recording is preferable because the recording is placed in a stable state prior to initialization). Also in certain compositions, the information of the recording layer is spontaneously transferred to the reference layer without the application of the reproduction field $H_R$, as soon as the influence of the field $H_{ini}$ is removed. In these cases the information may be reproduced from the reference layer.

The perpendicular magnetic anisotropy film constituting the recording layer and the reference layer is selected from the group consisting of (1) crystalline or amorphous ferromagnetic or ferrimagnetic materials having a Curie temperature but no compensation temperature, and (2) crystalline or amorphous ferrimagnetic materials having both a compensation temperature and a Curie temperature.

The first aspect utilizing the Curie temperature has been described. In contrast to this, the second aspect of the prior application utilizes decreased coercivity $H_C$ at a predetermined temperature exceeding the room temperature. The second aspect uses a temperature $T_{S1}$ at which the recording layer is magnetically coupled with the reference layer, in place of the temperature $T_{C1}$ in the first aspect. In addition, there is used, instead of the temperature $T_{C2}$, a temperature $T_{S2}$ at which the reference layer is reversed under the influence of the field Hb. Thus the second aspect can provide the same effect as in the first aspect.

In the following, there are employed the following symbols:

$H_{C1}$: coercivity of the recording layer;
$H_{C2}$: coercivity of the reference layer;
$T_{S1}$: temperature at which the recording layer becomes magnetically coupled to the reference layer;
$T_{S2}$: temperature at which the direction of magnetization of the reference is reversed under the influence of the field Hb;
$T_R$: room temperature;
$T_L$: medium temperature under the low-level laser beam irradiation;
$T_H$: medium temperature under the high-level laser beam irradiation;
$H_{D1}$: coupling field applied to the recording layer; and
$H_{D2}$: coupling field applied to the reference layer. In the second aspect, the recording medium satisfies the following Formula 6, and satisfies Formulas 7 to 10 at room temperature:

$$T_R < T_{S1} \approx T_L < T_{S2} \approx T_H \quad \text{Formula 6}$$

$$H_{C1} > H_{C2} + |H_{D1} \mp H_{D2}| \quad \text{Formula 7}$$

$$H_{C1} > H_{D1} \quad \text{Formula 8}$$

$$H_{C2} > H_{D2} \quad \text{Formula 9}$$

$$H_{C2} + H_{D2} < |H_{ini}| < H_{C1} + H_{D1} \quad \text{Formula 10.}$$

In the foregoing formulas, in double signs $\pm$ and $\mp$, the upper one corresponds to the A (anti-parallel) type medium, and the lower one corresponds to the P (parallel) type medium (these media will be explained later).

In the first and second aspects, the recording medium comprises a recording layer and a reference layer, each of which preferably comprises an amorphous ferrimagnetic material selected from transition metal (e.g. Fe, Co)- heavy rare earth metal (e.g. Gd, Tb, Dy and the like) alloy compositions.

When the recording layer and the reference layer are both selected from the transition metal - heavy rare earth metal alloy compositions, the direction and magnitude of magnetization appearing outside the alloy are determined by the relationship between the direction and magnitude of spin of transition metal atoms (TM) and those of heavy rare earth metal atoms (RE) inside the alloy. For example, the direction and magnitude of TM spin are represented by a dot-lined vector ↑, those of RE spin by a solid-lined vector ↑, and those of magnetization of the alloy as a whole by a double-lined vector ⇑. In this case the vector ⇑ is represented by the sum of vectors ↑ and ↑. However, in the alloy, the vectors ↑ and ↑ are directed in the opposite directions due to the mutual effect of the TM spin and the RE spin. Therefore, when these vectors are equal in magnitude to each other, the sum of the vectors ↓ and ↑ or the sum of the vectors ↓ and ↑ is zero (i.e. the magnitude of magnetization appearing outside the alloy is zero). The alloy composition making the sum of vectors zero is called a compensation composition. When the alloy is of different composition, the magnitude of magnetization is equal to the difference between the strengths of both spins, and the direction of vector ( ⇑ or ⇓ ) is equal to that of the larger vector. Magnetization corresponding to this vector appears outside the alloy.

When one of the vectors of the RM spin and TM spin is larger than the other, the alloy composition is referred to as "xx rich", named after the material of the larger spin (e.g. RE rich).

The recording layer and the reference layer can be classified into TM rich and RE rich compositions. Therefore, if the compositions of the recording layer are plotted along the ordinate and those of the reference layer are plotted along the abscissa, the types of the recording media of the prior application can be classified into four quadrants, as shown in FIG. 9. The P type media described previously belong to Quadrants I and III, and the A type media belong to Quadrants II and IV. Referring to FIG. 9, the intersection (origin) of the abscissa and the ordinate represents the compensation composition in both layers.

Speaking of the change in coercivity as a function of temperature, certain alloy compositions have such characteristics that the coercivity temporarily increases infinitely and then abruptly decreases before reaching the Curie temperature (at which the coercivity becomes zero). The temperature corresponding to the infinite coercivity is called the compensation temperature ($T_{comp}$). No compensation temperature is present between the room temperature and the Curie temperature in the TM rich alloy composition. The compensation temperature below the room temperature is meaningless in the magnetooptical recording, and, it is hence assumed in this specification that the compensation temperature is present between the room temperature and the Curie temperature.

If the recording and reference layers are classified in consideration of the presence or absence of the compensation temperature, the recording media can be classified into four types. The recording media in Quadrant I include all the four types of the media. The graphs in FIGS. 10A to 10D respectively show the relationship between the coercivity and the temperature of the four types of media. Note that thin curves represent characteristics of the recording layer, and bold curves represent those of reference layer.

When the recording layer and the reference layer are classified by the RE or TM rich characteristics and the presence/absence of the compensation temperature, there are obtained 9 classes.

TABLE 1

| Class | Recording layer: RE rich | Reference layer; RE rich | Type |
|---|---|---|---|
| | Quadrant I | | |
| 1 | $T_{comp}$ | $T_{comp}$ | 1 |
| 2 | No $T_{comp}$ | $T_{comp}$ | 2 |
| 3 | $T_{comp}$ | No $T_{comp}$ | 3 |
| 4 | No $T_{comp}$ | No $T_{comp}$ | 4 |
| | Quadrant II | | |
| Class | Recording layer: RE rich | Reference layer: TM rich | Type |
| 5 | $T_{comp}$ | No $T_{comp}$ | 3 |
| 6 | No $T_{comp}$ | No $T_{comp}$ | 4 |
| | Quadrant III | | |
| Class | Recording layer: TM rich | Reference layer: TM rich | Type |
| 7 | No $T_{comp}$ | No $T_{comp}$ | 4 |
| | Quandrant IV | | |
| Class | Recording layer: TM rich | Reference layer: RE rich | Type |
| 8 | No $T_{comp}$ | $T_{comp}$ | 2 |
| 9 | No $T_{comp}$ | No $T_{comp}$ | 4 |

The principle of the method of the prior application will be described in detail using a specific medium No. 1 belonging to Class 1 (P type, Quadrant I, Type 1) shown in Tab. 1.

In the prior application, there is required means for applying the initial field $H_{ini}$ for enabling the overwriting, so that the recording apparatus is constructed as schematically shown in FIG. 11.

A head containing a light source 23 is provided above the medium 20, and provided below are rotating means 21, initial field $H_{ini}$ applying means 22 and bias field Hb applying means 25.

Because of the positioning of various means above and below the recording medium, the conventional recording apparatus has been associated with a drawback of a large height, and thus a large volume.

SUMMARY OF THE INVENTION

An object of the present invention is to minimize the height of the overwritable magnetooptical recording apparatus, thereby compacting the apparatus.

In order to achieve the above-mentioned object, the present invention firstly provides a magnetooptical recording apparatus capable of overwriting provided with:

rotating means for rotating a magnetooptical recording medium;

means for applying an initial field;

a light source for emitting a laser beam;

modulation means for modulating the beam intensity either to (1) a high level for providing the medium with a temperature suitable for forming either of the bit with upward magnetization and the bit with downward magnetization, or to (2) a low level for providing the medium with a temperature suitable for forming the other of said bits, according to binary information to be recorded; and means for applying a bias field, and featured by a fact that said rotating means, initial field applying means, light source and bias field applying means are positioned in one side with respect to the surface of said medium.

More specifically, the magnetic field applying means is composed of an electromagnet or a permanent magnet. Either in the present invention or in the invention of the prior application, the bias field Hb or the initial field $H_{ini}$ need not be modulated in direction, in contrast to those in the conventional magnetooptical recording. Consequently a permanent magnet may be employed in fixed manner, and, a thin magnet plate can be used for the bias field Hb which can be relatively weak. In this case the height of the recording apparatus is not so large even if the bias field applying means is positioned on the opposite side across the recording medium.

Thus, the present invention secondly provides an overwritable magnetooptical recording apparatus featured by a fact that the medium rotating means, the light source and at least a part of the initial field applying means are positioned on one side with respect to the surface of the recording medium while the bias field applying means is positioned on the other side.

BRIEF DESCRIPTION OF THE DRAWINGS

FIG. 2 is a schematic view showing the structure of a recording medium in the prior art;

FIG. 4 is a schematic view showing the recording operation in a conventional recording medium;

FIGS. 5 and 6 are views showing the state changes in the recording medium depending on the intensity of the laser beam;

DESCRIPTION OF THE PREFERRED EMBODIMENTS

Embodiment

Figure 1:
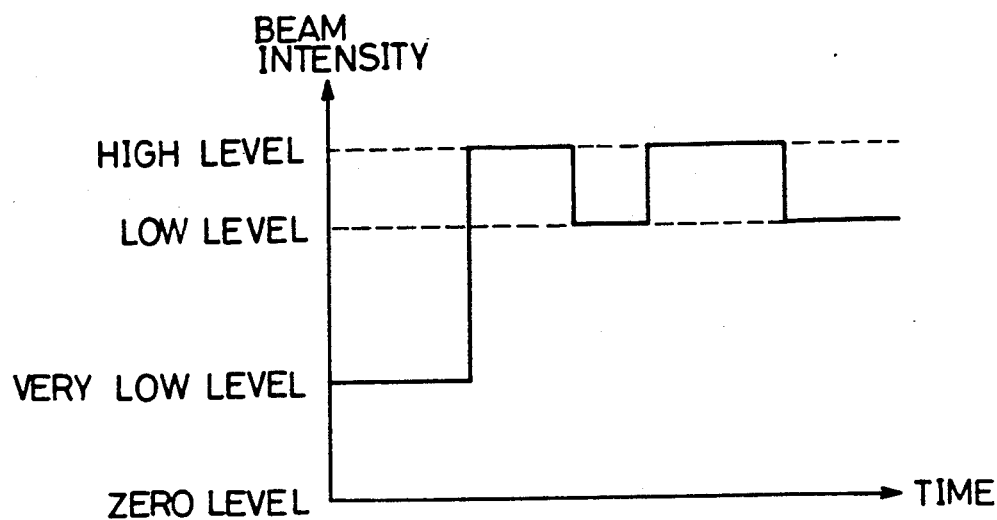
FIG. 1 is a wave form chart of a laser beam intensity in the prior technology.
Figure 3:
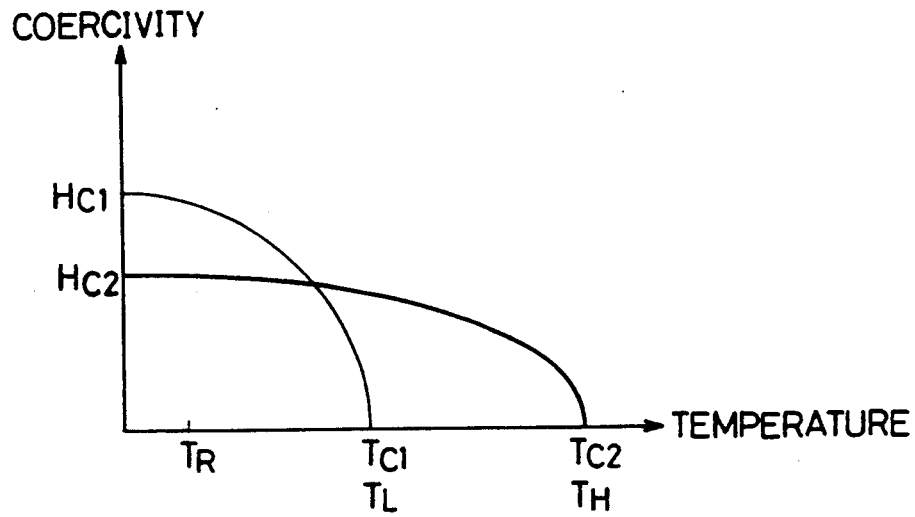
FIG. 3 is a chart showing the temperature dependent characteristics of a conventional recording medium.
Figure 7:
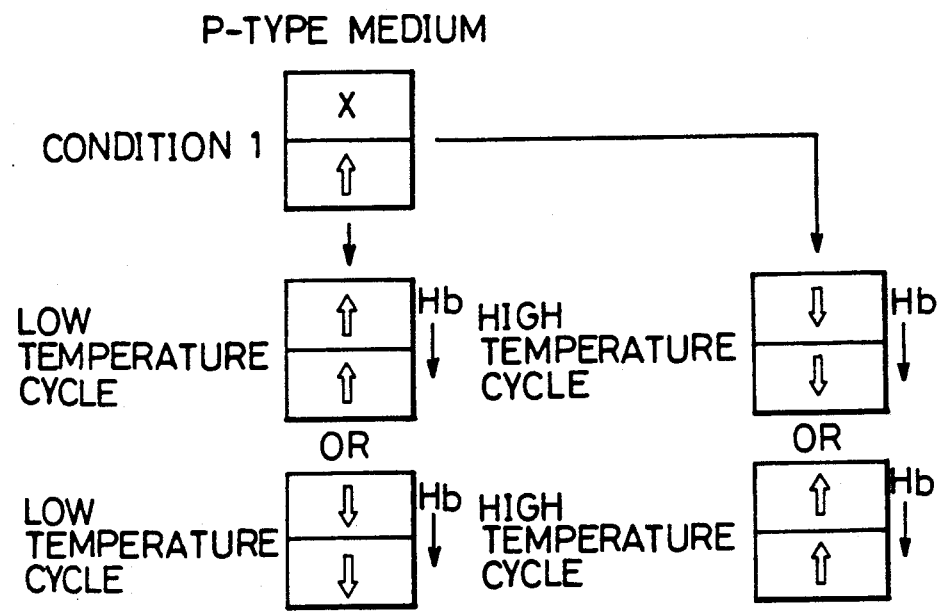
FIGS. 7 and 8 are views showing the functions shown in FIGS. 5 and 6, in different types of the recording medium.
Figure 8:
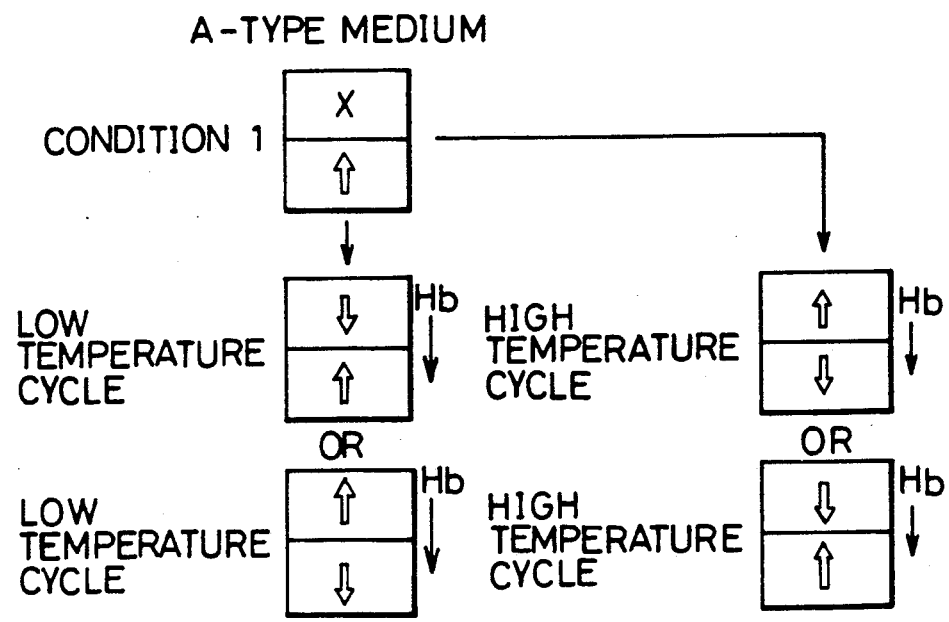
Figure 9:
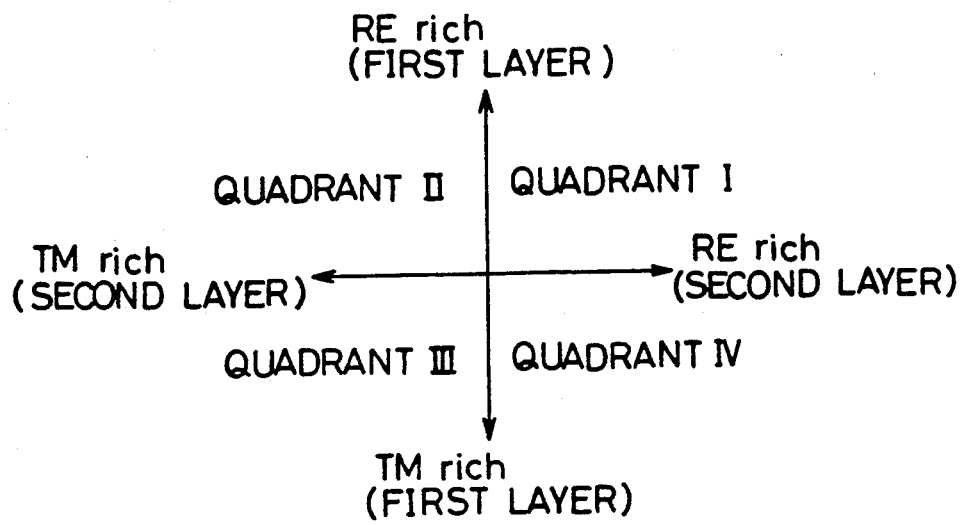
FIG. 9 is a chart showing different classes of conventional media.
Figure 11:
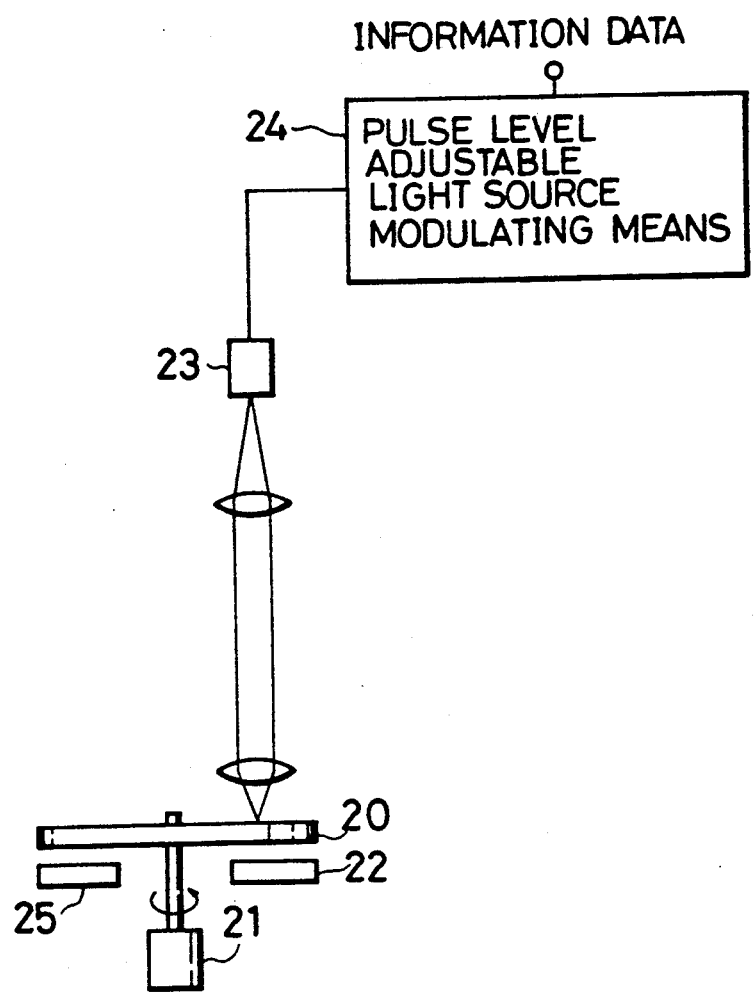
FIG. 11 is a schematic view of a conventional recording apparatus.
Figure 10A:
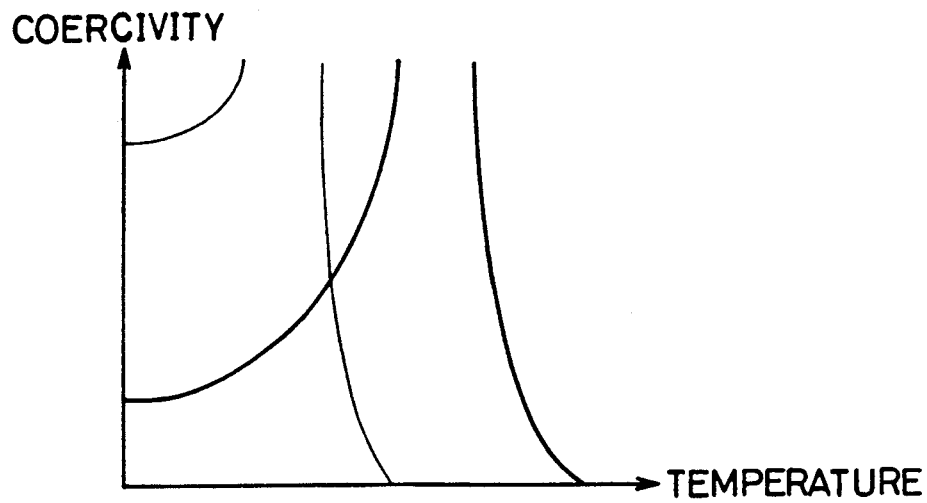
FIGS. 10A to 10D are charts showing the relation between coercivity and temperature in different types shown in FIG. 9.
Figure 10B:
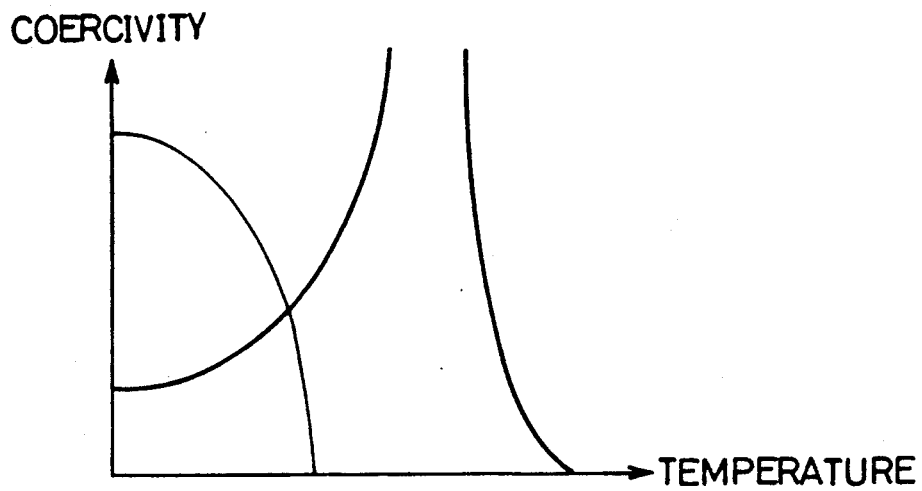
Figure 10C:
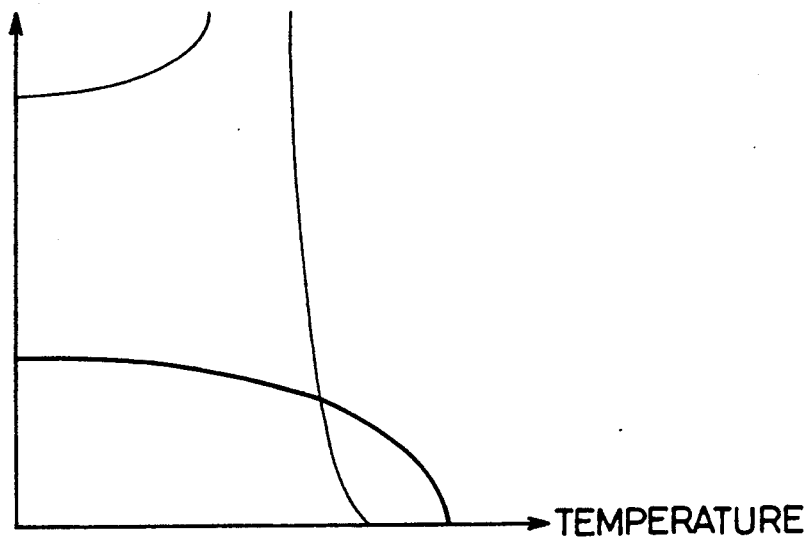
Figure 10D:
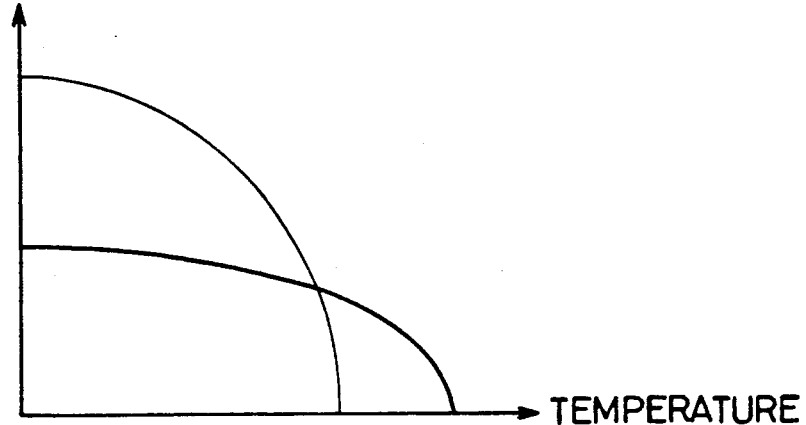
Figure 12:
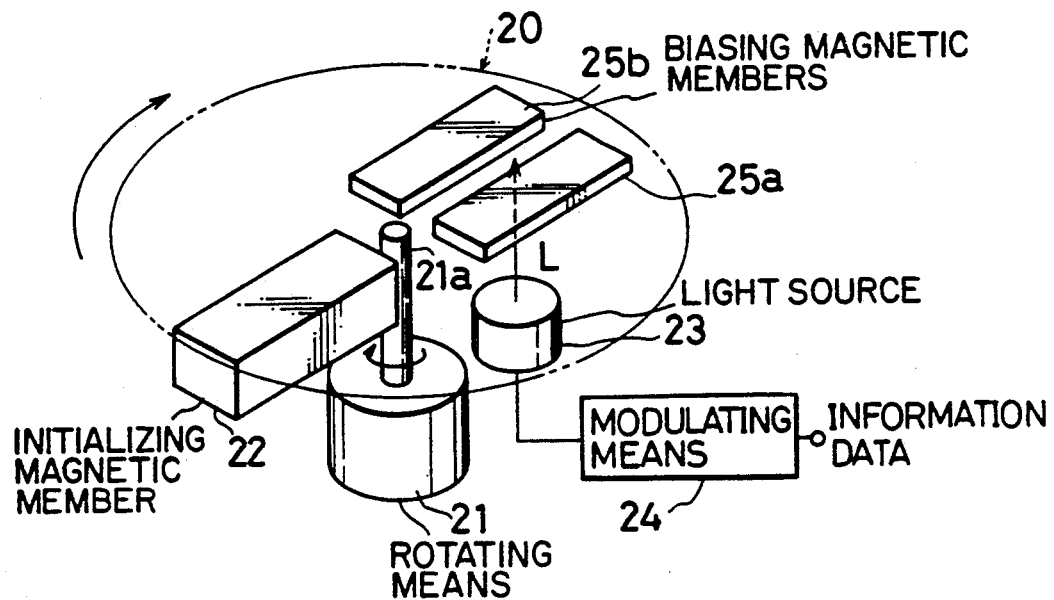
FIGS. 12 and 13 are schematic views of a first embodiment of the present invention.
Figure 13:
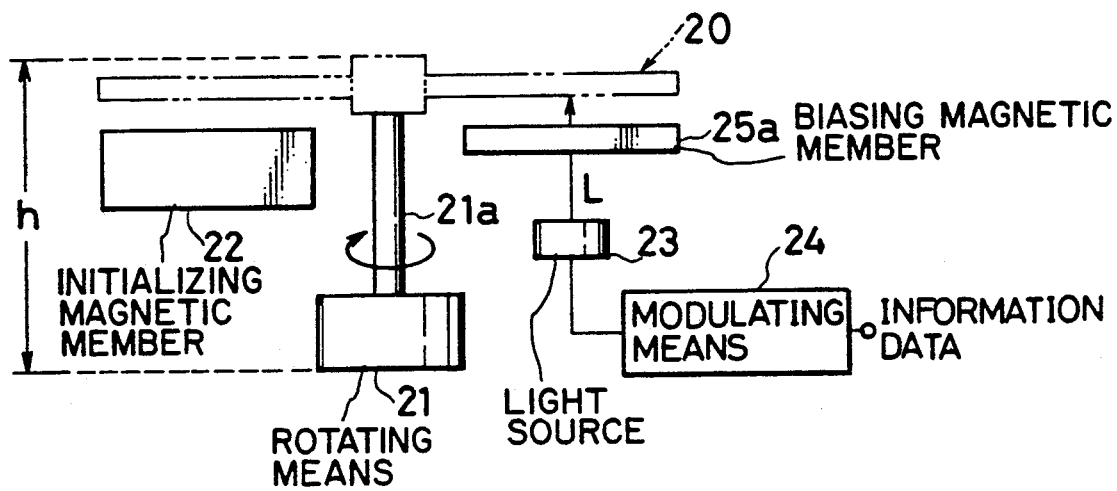

FIG. 12 is a schematic perspective view, seen from diagonally above, of a magnetooptical recording apparatus embodying the present invention, and FIG. 13 is an elevation view of the principal part of the apparatus.

Initial field $H_{ini}$ applying means 22 may be composed either of an electromagnet or a permanent magnet, but a permanent magnet is employed in the present embodiment.

Bias field Hb applying means is composed of a pair of thin plate-shaped permanent magnets 25a, 25b with a gap therebetween for allowing the laser beam to pass through. The magnets 25a, 25b are directed the same with respect to the recording medium, and the synthesized field of the paired magnets is applied, as the field Hb, to the medium 20.

In the present embodiment, the medium rotating means 21, initial field applying means 22, head including a light source 23, and bias field applying means 25 are all positioned below the recording medium 20, so that the height h of the apparatus is the smallest of the different embodiments.

Embodiment 2

Figure 14:
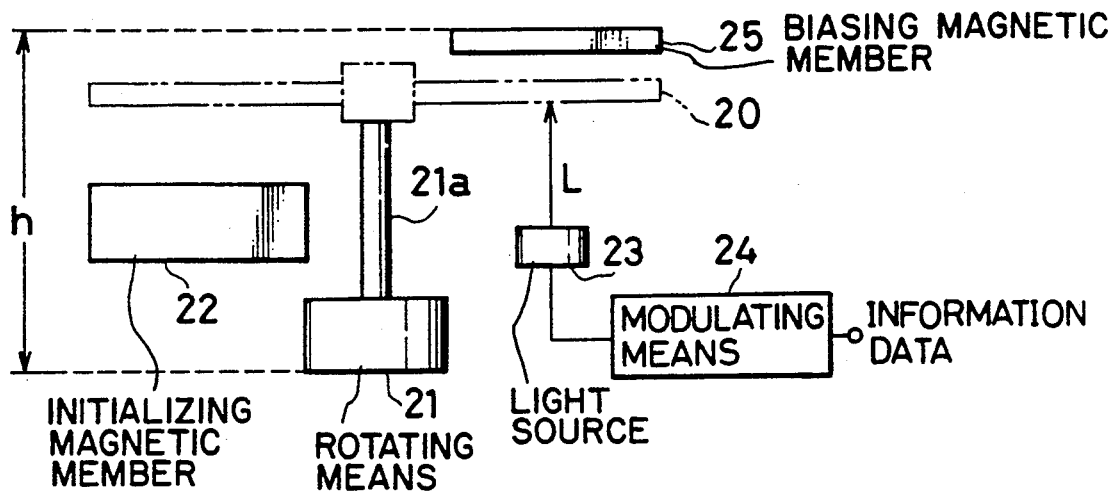
FIG. 14 is a schematic view of a second embodiment of the present invention.
Figure 15:
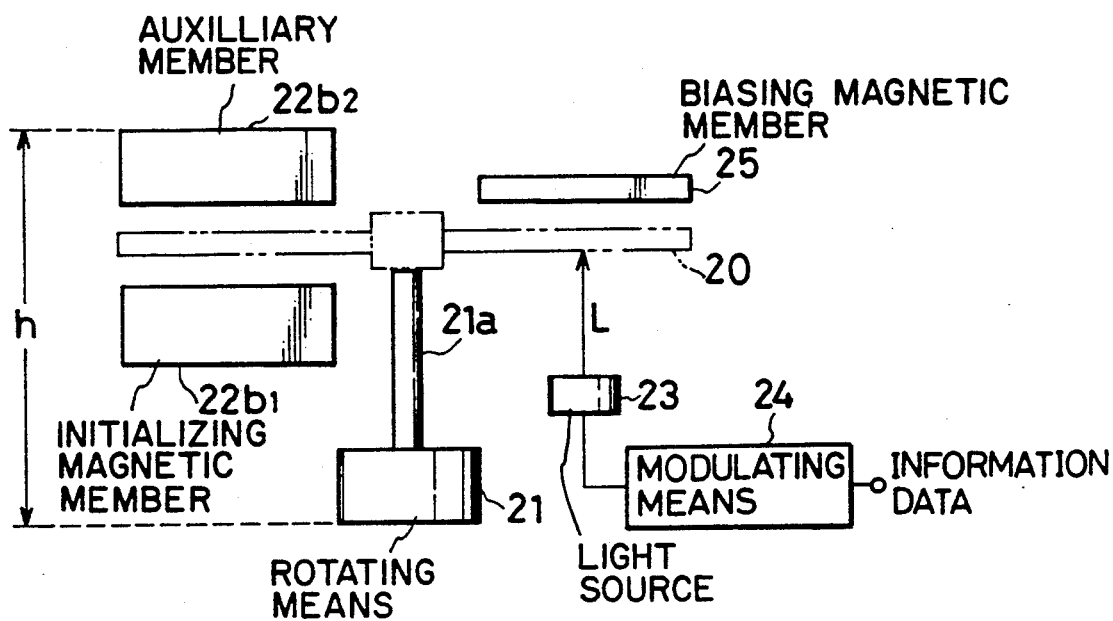
FIG. 15 is a view showing the principle of a third embodiment of the present invention.

As shown in FIG. 14, the bias field Hb applying means is composed of a thin plate-shaped permanent magnet 25, which alone is positioned above the medium 20. The height h of the apparatus is however not so large.

The magnet 25, being positioned above and therefore not intercepting the laser beam (L), can be made of a single piece.

Embodiment 3

The magnetic field generated by a single electromagnet or a single permanent magnet generally diverges and becomes weaker before reaching the medium.

The present inventor has therefore tried to position identical $H_{ini}$ applying magnets $22b_1$, $22b_2$ above and below the medium with a gap wider than the thickness of the recording medium 20, thereby preventing the dispersion of the magnetic flux and improving the efficiency of field application to the medium.

However, since the initial field $H_{ini}$ is relatively large, large magnets are required whereby the height h is increased, contrary to an object of the present invention.

Further investigation has clarified that the efficiency can be improved by placing the magnetic member $22b_1$ composed of a permanent magnet at the same side of the head including the light source 23, and placing an auxiliary member $22b_3$ opposite to member $22b_1$, and auxiliary member $23b_3$ can be composed of a thin plate-shaped magnet or a thin plate-shaped soft magnetic material such as an iron plate.

Figure 16:
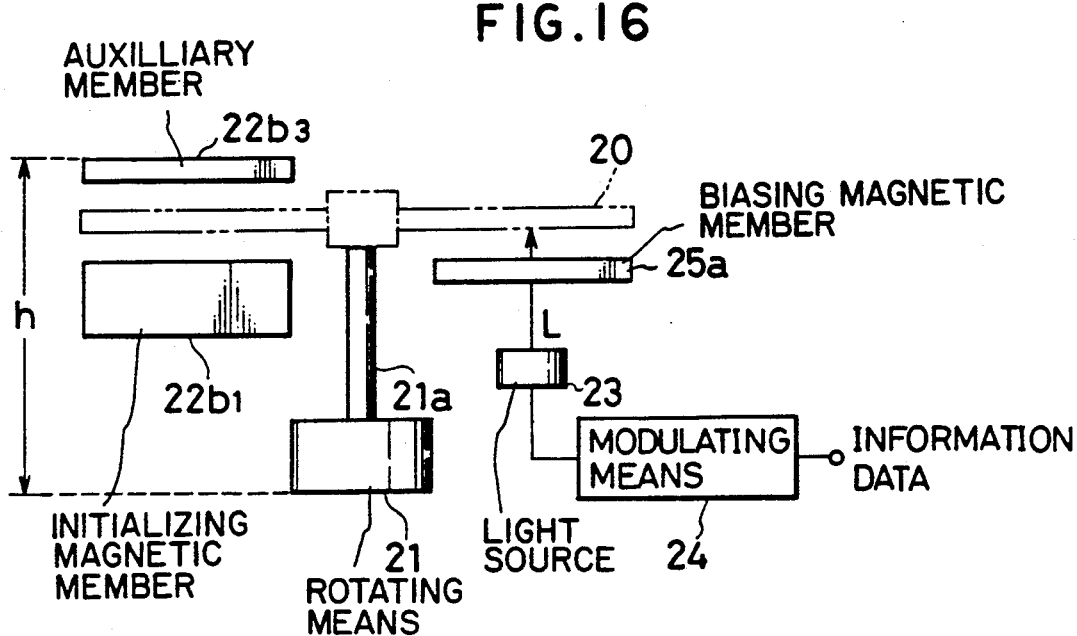
FIG. 16 is a schematic view of a third embodiment of the present invention.

Thus, in the third embodiment, as shown in FIG. 16, the initial field applying means is composed of magnets $22b_1$, $22b_3$ of different thicknesses positioned vertically in a pair, and the thicker magnet $22b_1$ is positioned, together with the rotating means and the light source, at a side of the surface of the medium while the auxiliary member $22b_3$ composed of the thinner magnet is positioned on the other side.

The use of a pair of magnets as the initial field applying means realizes efficient application of the initial field $H_{ini}$ onto the recording medium.

The height h of the apparatus is not increased too much, since the magnet $22b_3$ of the upper side is thin.

The recording field applying means is composed of the magnets 25a and 25b as in the first embodiment.

Embodiment 4

Figure 17:
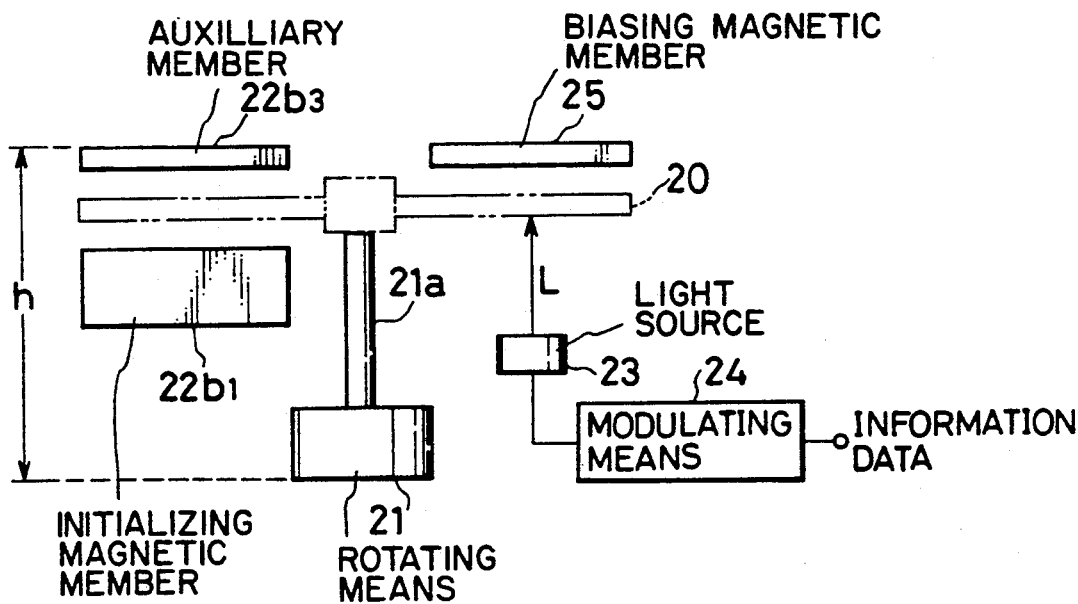
FIG. 17 is a schematic view of a fourth embodiment of the present invention.

The fourth embodiment provides a magnetooptical recording apparatus capable of overwriting, in which, as shown in FIG. 17, the initial field applying means is composed of a principal thick magnet $22b_1$ and an auxiliary thin magnet $22b_3$ as in the third embodiment.

It is however different from the third embodiment in that the bias field Hb applying means is composed of a thin plate-shaped permanent magnet and positioned above the bias medium 20, as in the second embodiment.

The height h of the apparatus is substantially equal to that of the third embodiment, since the thin magnet $22b_3$ positioned at the upper side is not significantly different in thickness from the magnet 25 constituting the bias field applying means.

What is claimed is:

1. A recording apparatus for recording data on a magnetooptical disk, comprising:
   a) rotating means for supporting and rotating the magnetooptical disk;
   b) laser beam generating means positioned at the same side of said magnetooptical disk as said rotating means, said generating means irradiating the magnetooptical disk supported by said rotating means with a laser beam;
   c) control means for controlling the intensity of the laser beam from said laser beam generating means, on the basis of binary information to be recorded, said control means being positioned at said same side of the magnetooptical disk supported by said rotating means;
   d) initial field applying means for initializing the magnetooptical disk by applying an initial field to said magnetooptical disk supported by said rotating means, in an area of said disk to be irradiated by said laser beam; and
   e) bias field applying means for applying a bias field to an area of the magnetooptical disk irradiated by said laser beam;
   f) said initial field applying means comprising a magnetic member and an auxiliary member, said magnetic member being positioned at said same side of the magnetooptical disk supported by said rotating means, while said auxiliary member being positioned at the opposite side of the magnetooptical disk supported by said rotating means and in opposed relationship to said magnetic member, and the thickness of said magnetic member, in a direction of arrangement of said magnetic and auxiliary members, being larger than that of said auxiliary member in said direction, said bias field applying means being positioned at said same side of said magnetooptical disk as said rotating means, said auxiliary member serving to reduce the dispersion of the magnetic flux generated by said magnetic member, at the magnetooptical disk.

2. An apparatus according to claim 1, wherein said control means is adapted to vary the intensity of said laser beam between a first level and a second level according to the binary information to be recorded, said first level is such as to provide the magnetooptical disk with a temperature suitable for forming either one of a bit having a magnetization upward with respect to the surface of said magnetooptical disk and a bit having a downward magnetization, while said second level is such as to provide the magnetooptical disk with a temperature suitable for forming the other of said bit with upward magnetization and said bit with downward magnetization.

3. An apparatus according to claim 1, wherein said bias field applying means comprises a first magnetic member and a second magnetic member, which are positioned at opposite sides of a path of said laser beam and spaced substantially side by side along the rotating direction of said magnetooptical disk, and in which the magnetic poles of said first and second magnetic members are aligned in mutually the same direction with respect to said magnetooptical disk.

4. An apparatus according to claim 1, wherein the magnetooptical disk supported by said rotating means comprises a recording layer and a reference layer.

5. A recording apparatus for recording data on a magnetooptical disk, comprising:
a) rotating means for supporting and rotating the magnetooptical disk;
b) laser beam generating means positioned at the same side of said magnetooptical disk as said rotating means, said generating means irradiating the magnetooptical disk supported by said rotating means with a laser beam;
c) control means for controlling the intensity of the laser beam from said laser beam generating means, on the basis of binary information to be recorded, said control means being positioned at said same side of the magnetooptical disk supported by said rotating means;
d) initial field applying means for initializing the magnetooptical disk by applying an initial field to said magnetooptical disk supported by said rotating means, in an area of said disk to be irradiated by said laser beam; and
e) bias field applying means for applying a bias field to an area of the magnetooptical disk irradiated by said laser beam;
f) said initial field applying means comprising a magnetic member and an auxiliary member, said magnetic member being positioned at said same side of the magnetooptical disk supported by said rotating means, while said auxiliary member being positioned at the opposite side of the magnetooptical disk supported by said rotating means and in opposed relationship to said magnetic member, and the thickness of said magnetic member, in a direction of arrangement of said magnetic and auxiliary members, being larger than that of said auxiliary member in said direction, said bias field applying means being positioned at said opposite side of the magnetooptical disk supported by said rotating means, said auxiliary member serving to reduce the dispersion of the magnetic flux generated by said magnetic member, at the magnetooptical disk.

6. An apparatus according to claim 5, wherein said bias field applying means comprises a further magnetic member, and the thickness of the further magnetic member, in a direction of arrangement of the first-mentioned magnetic member and the auxiliary member, is smaller than that of the first-mentioned magnetic member in the same direction.

* * * * *